United States Patent [19]
Dinant

[11] Patent Number: 5,769,528
[45] Date of Patent: Jun. 23, 1998

[54] HEADLAMP WITH OPTIONAL LENS WASHING DEVICE, AND A METHOD FOR MAKING SUCH HEADLAMP

[75] Inventor: Franck Dinant, Virginal, Belgium

[73] Assignee: Valeo Vision, Bobigny, France

[21] Appl. No.: 752,217

[22] Filed: Nov. 19, 1996

[30] Foreign Application Priority Data

Aug. 26, 1996 [DE] Germany ................ 296 14 796 U

[51] Int. Cl.⁶ ................................................ F21V 33/00
[52] U.S. Cl. .......................... 362/96; 362/80; 239/284.2
[58] Field of Search ........................ 239/284.2; 362/61, 362/80, 96, 253, 332

[56] References Cited

U.S. PATENT DOCUMENTS 3,866,840  2/1975  Harkrider ........................... 239/284.2
4,368,505  1/1983  Tomforde ........................... 362/80

Primary Examiner—Stephen F. Husar
Attorney, Agent, or Firm—McCormick, Paulding & Huber

[57] ABSTRACT

A headlamp for a motor vehicle includes a hollow body. A lens closes a front opening of said body and has along one edge thereof either a secondary portion integral with a primary portion of said lens, or a recess instead said secondary portion. The lens is cut with said secondary portion integral with said lens when no lens washing device is provided on the headlamp. The lens is cut without said secondary lens portion, when the headlamp is to be equipped with a lens washing device, so as to define a recess through which said lens washing device can project when in use.

10 Claims, 2 Drawing Sheets

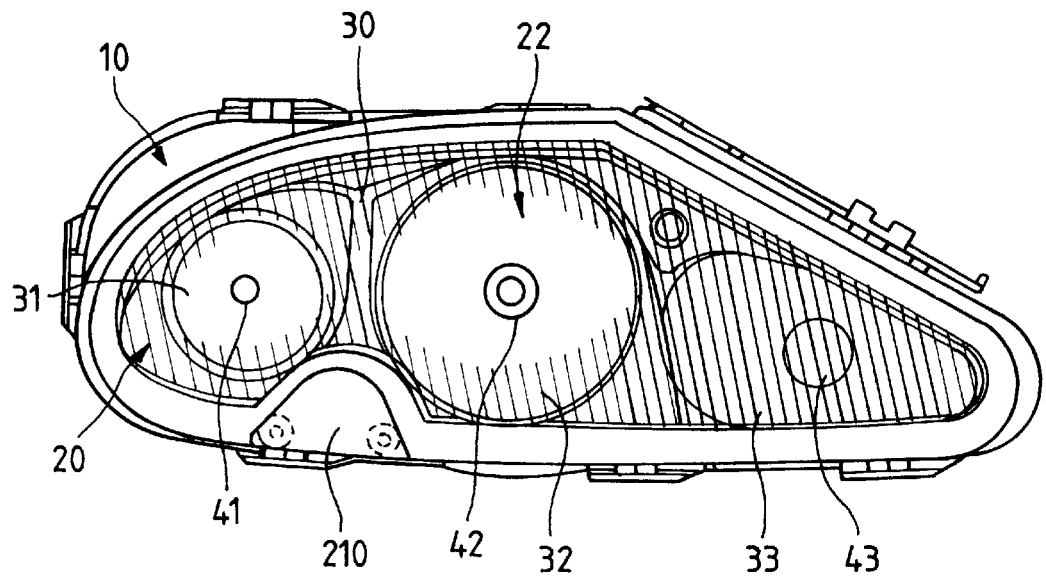
FIG_1
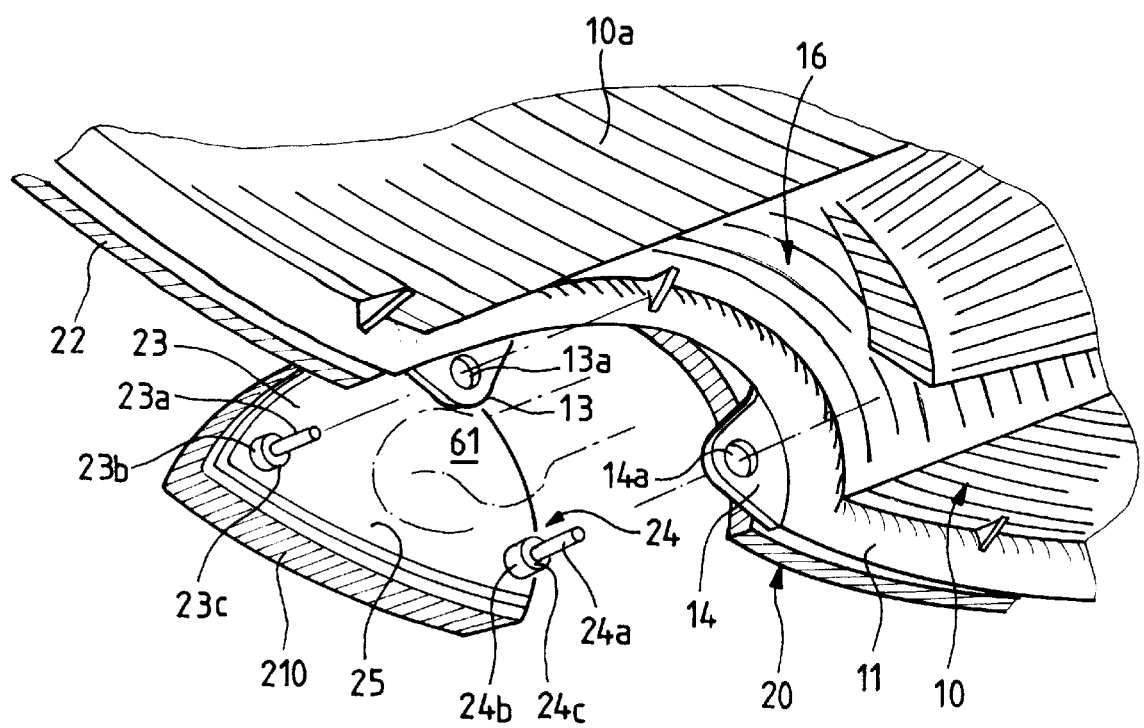
FIG_4

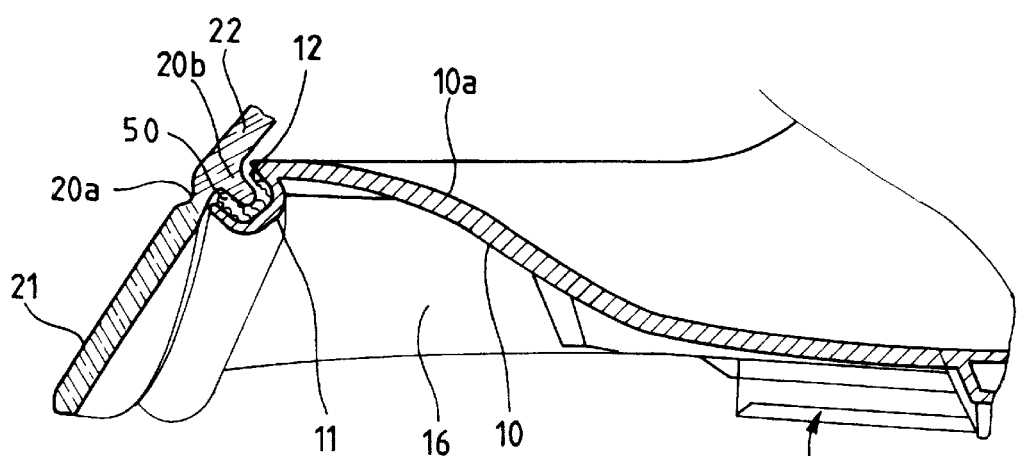
FIG_3
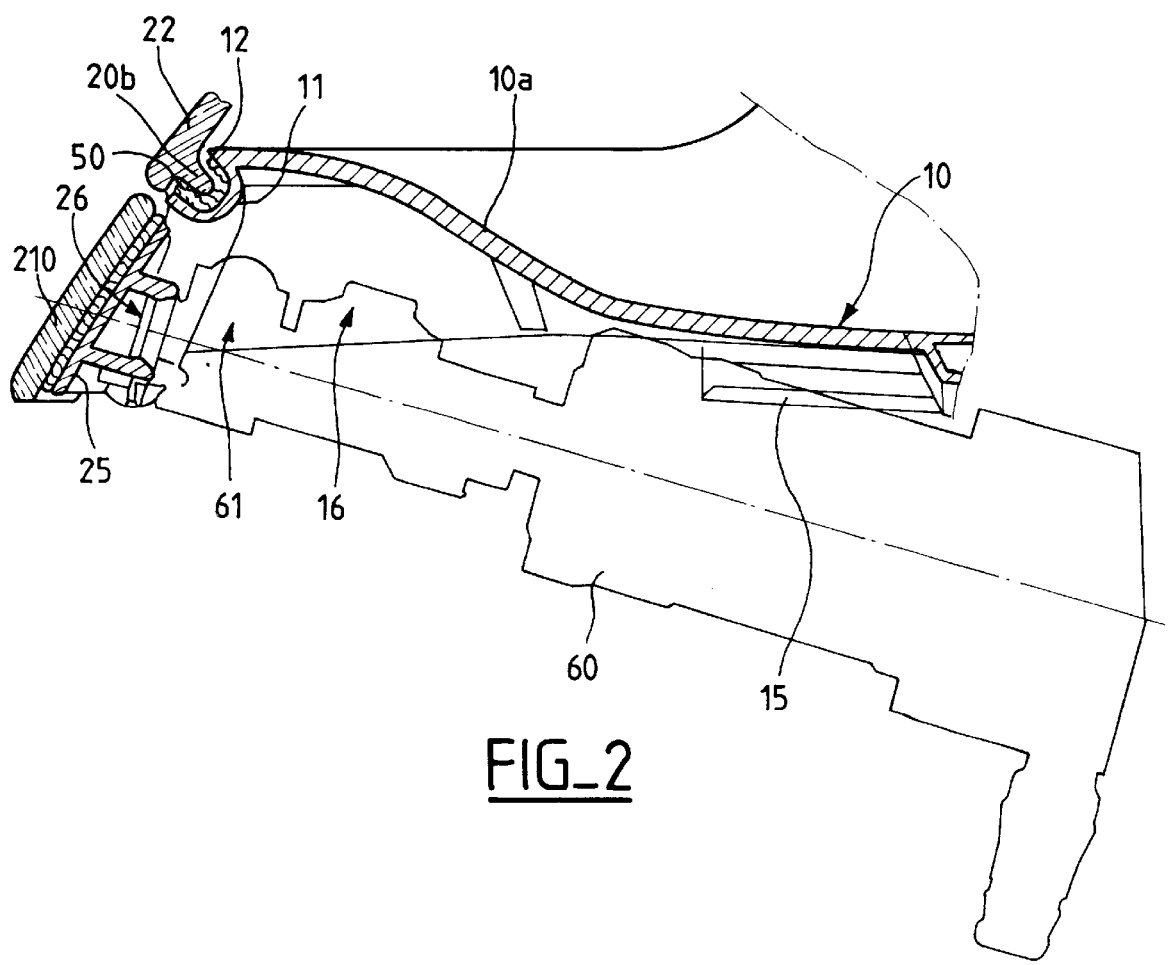
FIG_2

5,769,528

HEADLAMP WITH OPTIONAL LENS WASHING DEVICE, AND A METHOD FOR MAKING SUCH HEADLAMP

This invention relates to a headlamp for a motor vehicle, which can be selectively provided with a lens washing device, and to a method for making a headlamp provided with a lens washing device.

BACKGROUND OF THE INVENTION

Lens washing devices are well known in the art. An example of such device is illustrated in European patent No. 0 511 104.

Conventionnally, and as also illustrated by European patent No. 0 508 853, such lens washing device can be incorporated into a headlamp so that, when the washing device is at rest, i.e. in a recessed position, there is some continuity of aspect between the lens of the headlamp and the front end of the washing device, which is plate-shaped and located flush with the lens surface.

However, the headlamp and washing device combination as shown in European patent No. 0 508 853 needs a specific design both for the lens and the frame which carries these elements. Therefore, it is impossible in such known headlamp to have a common design for the lens and the housing of the headlamp, and also for the frame supporting said headlamp, and to leave the possibility to provide or not the headlamp with a lens washing device.

SUMMARY OF THE INVENTION

The present invention seeks to mitigate these drawbacks and to provide a headlamp construction which can selectively include or not include a lens washing device.

More particularly, the present invention seeks to provide a headlamp in which no change in the support structure is necessary when the headlamp is to be provided with a lens washing device, and in which the lens needs only a minor adaptation in such case.

Accordingly, the present invention provides a headlamp for a motor vehicle, including a hollow body and a lens closing a front opening of said body, said lens having along one edge thereof a separable secondary portion initially made integral with a primary portion of said lens, said secondary lens portion being adapted to remain integral with said lens when no lens washing device is provided in the headlamp and being adapted to be separated from said primary lens portion when the headlamp is to be equipped with a lens washing device, so as to define a recess through which said lens washing device can project in use.

Said secondary lens portion is preferably provided at a bottom edge of said lens and has a generally semi-circular shape.

In an advantageous manner, the headlamp further comprises a decorative item having a shape similar to said secondary lens portion and including means for securement to a movable front nozzle of said lens washing device.

Is is also preferable that said decorative item includes guiding means adapted to cooperate with corresponding guiding means provided on said body, so as to secure the position of said decorative item relatively to said primary lens portion when said nozzle is in its recessed position.

In order to obtain a satisfactory appearance of the headlamp, said decorative item may be essentially flush with said primary lens portion when said nozzle is in its recessed position.

The present invention also provides a headlamp for a motor vehicle, including a hollow body and a lens closing a front opening of said body, and a lens washing device mounted on the outside of said body and having a washing nozzle capable of projecting beyond a general plane of said lens adjacent an edge thereof, wherein said washing head bears at the front a decorative item having a shape similar to a lens portion which has been cut away from said lens.

Finally, this invention provides a method for manufacturing a motor vehicle headlamp without or with a lens washing device, said headlamp having a hollow body receiving at least one reflector and one associated bulb, and a lens closing a front opening of said body, said method comprising the following steps:

(a) depending on whether the headlamp includes or not a lens washing device, obtaining by cutting either a lens having a primary portion and a secondary portion, or a lens having a primary portion and a recess instead of said secondary portion;

(b) mounting the lens on the headlamp body;

(c) if the headlamp is to include a lens washing device, mounting said lens washing device having a linearly displacable front nozzle on a wall of said body, so that said nozzle in a rest position is adjacent a general plane of said lens and is capable of protruding through said recess;

(d) mounting a decorative item on said nozzle so that in the rest position thereof, said decorative item is essentially flush with said lens.

BRIEF DESCRIPTION OF THE DRAWINGS

The invention will be more clearly illustrated in the following description, made with reference to the appended drawings.

In the drawings:

FIG. 1 is a front view of a headlamp according to the present invention,

FIG. 2 is an axial cross-section through a bottom region of the headlamp equipped with a lens washing device, FIG. 3 is an axial cross-section view similar to FIG. 2 of a headlamp having no lens washing device, and FIG. 4 is a bottom perspective view of the bottom region of the headlamp equipped with a lens washing device.

DETAILED DESCRIPTION OF A PREFERRED EMBODIMENT

FIG. 1 shows a headlamp for a motor vehicle, said headlamp conventionally having a hollow body or housing 10, a lens 20 closing the front opening of the housing, and an optical member 30 defining a plurality of reflectors 31, 32, 33 associated with suitable bulbs diagramatically shown at 41, 42 and 43. The invention also applies to "sealed beam" type headlamp, i.e. where the housing is sealed to the lens and defines by itself a reflector.

Now referring to FIGS. 1 and 3, when the headlamp is not equipped with a lens washing device, the lens 20 is obtained by cutting so as to include a primary zone 22 and a secondary, smaller zone 21 of generally semi-circular shape in its bottom region (see FIG. 3).

Secondary zone 21 is made integral with the primary zone 22, being delimited therefrom and connected thereto by a thinner boundary zone 20a, as shown in particular in FIG. 3.

FIG. 3 also shows that lens 20 comprises above and along said boundary zone 20a an inwardly extending, curved rib 20b which is adapted to fit into a corresponding curved groove 12 formed at a front portion 11 of body 10.

An elastomeric seal 50, or alternatively a viscous sealing material, in placed within said groove 12 so as to seal the body/lens assembly in this region, while the body/lens sealing in the other regions of the headlamp is performed by conventional sealing means of analogous type (not shown).

When the headlamp is to be supplied without a lens washing device, lens 20 is provided as such, i.e. with secondary zone 21 integral with primary zone 22, so that the lens covers the full front end of the headlamp.

When the headlamp is to be provided with a lens washing device of the telescopic type, for instance of the general type described in European Patent No. 0 511 104, which is incorporated herein by reference, the lens 20 is cut so as to leave only the primary zone 22, the secondary zone 21 being cut away during the cutting process.

Preferably, the cutting operation is performed in both cases (i.e. with or without secondary portion 21) by means of a high-speed water jet technique, which leaves very clean edges after cutting.

A lens washing device diagramatically shown at 60 is mounted beneath the bottom wall 10a of body 10, for instance by means of mounting arrangement 15 shown in FIGS. 2 and 3. Said mounting arrangement is for instance of the sliding type.

The one skilled in the art will understand that this mounting arrangement is not directly related to the present invention, and that any other conventional means can be used.

Once mounted, the lens washing device 60 occupies a slanting position in an essentially complementary recess 16 formed in the bottom wall 10a, such that its front end is directed towards the recess of lens 20 obtained when cutting the lens along the transition line between primary zone 22 and secondary zone 21.

In the prefered embodiment, a decorative item 210 is provided and has dimensions and shape essentially complementary to the recess left by the secondary zone 21 of lens once cut-off. Such decorative item is secured to a platen 25 which is designed for mounting said decorative item 210 on the displaceable front nozzle 61 of lens washing device 60. The platen is secured to decorative item 210 for instance by gluing, snap-fitting, etc. . .

In the present example, the mounting of decorative item 210/platen 25 assembly on washing nozzle 61 involves an arrangement of flexible tabs 26 which are made integral with platen 25, which extend inwardly towards the washing nozzle 61 and which engage a sharp front edge of said nozzle.

Further, platen 25 and housing 10 are provided with respective guiding means adapted to guide the decorative item 210 to the correct position relative to the primary zone 22 of lens 20 when the washing device is brought into an inoperative, recessed position.

Said guiding means include a pair of lugs 23, 24 made integral with platen 25 and comprising respectively a distal portion 23a, 24a and a proximal portion 23b, 24b adjacent to platen 25, the distal and proximal portions being connected to each other by frusto-conical portions 23c, 24c. Said lugs extend parallel to the direction of displacement x—x (FIG. 2) of the washing nozzle 61. Correspondingly, the front region 11 of body 10 is provided with a pair of plate-shaped protrusions 13, 14 extending in a plane which is perpendicular to the x—x direction, each plate being provided with a circular hole, respectively 13a, 14a adapted to receive the narrow portion and then the wider portion of the respective lug 23, 24.

This guiding arrangement allow to obtain a precise positioning of decorative item 210 relative to primary lens zone 22 when the washing nozzle is in its recessed, inoperative position, so as to obtain a satisfactory appearance of the headlamp. More particulary, in the rest position of nozzle 61, the front face of decorative item 210 is flush with the front face of the lens, and the gap between lens 20 and decorative item 210 can be narrow and have an essentially constant width.

I claim:

1. A headlamp for a motor vehicle, including a hollow body and a lens closing a front opening of said body, said lens having along one edge thereof a separable secondary portion initially made integral with a primary portion of said lens, said secondary lens portion being adapted to remain integral with said lens when no lens washing device is provided in the headlamp and being adapted to be separated from said primary lens portion when the headlamp is to be equipped with a lens washing device, so as to define a recess through which said lens washing device can project in use.

2. A headlamp according to claim 1, wherein said secondary lens portion is provided at a bottom edge of said lens.

3. A headlamp according to claim 2, wherein said secondary lens portion is of generally semi-circular shape.

4. A headlamp according to claim 1, further comprising a decorative item having a shape similar to said secondary lens portion and including means for securement to a movable front nozzle of said lens washing device.

5. A headlamp according to claim 4, wherein said decorative item includes guiding means adapted to cooperate with corresponding guiding means provided on said body, so as to secure the position of said decorative item relatively to said primary lens portion when said nozzle is in its recessed position.

6. A headlamp according to claim 4, wherein said decorative item is essentially flush with said primary lens portion when said nozzle is in its recessed position.

7. A headlamp according to claim 1, wherein said body includes a recessed region for said lens washing device in the vicinity of said lens recess.

8. A headlamp for a motor vehicle, including a hollow body and a lens closing a front opening of said body, and a lens washing device mounted on the outside of said body and having a washing nozzle capable of projecting beyond a general plane of said lens adjacent an edge thereof, wherein said washing head bears at the front a decorative item having a shape similar to a lens portion which has been cut away from said lens.

9. A method for manufacturing a motor vehicle headlamp without or with a lens washing device, said headlamp having a hollow body receiving at least one reflector and one associated bulb, and a lens closing a front opening of said body, said method comprising the following steps:

(a) depending on whether the headlamp includes or not a lens washing device, obtaining by cutting either a lens having a primary portion and a secondary portion, or a lens having a primary portion and a recess instead of said secondary portion;

(b) mounting the lens on the headlamp body;

(c) if the headlamp is to include a lens washing device, mounting said lens washing device having a linearly displacable front nozzle on a wall of said body, so that said nozzle in a rest position is adjacent a general plane of said lens and is capable of protruding through said recess;

(d) if the headlamp is to include a lens washing device, mounting a decorative item on said nozzle so that in the rest position thereof, said decorative item is essentially flush with said lens.

10. A method according to claim 9, wherein said cutting step is performed by high pressure water jet cutting.

* * * * *